United States Patent
Chen et al.

(10) Patent No.: US 9,965,811 B2
(45) Date of Patent: May 8, 2018

(54) TECHNIQUES TO PROMOTE MESSAGES

(71) Applicant: Facebook, Inc., Menlo Park, CA (US)

(72) Inventors: Sizhe Chen, Menlo Park, CA (US); Anthony Kamenick, Menlo Park, CA (US); Lee Linden, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 1002 days.

(21) Appl. No.: 13/965,574

(22) Filed: Aug. 13, 2013

(65) Prior Publication Data
US 2015/0052070 A1 Feb. 19, 2015

(51) Int. Cl.
G06Q 10/00 (2012.01)
G06Q 50/00 (2012.01)
H04L 12/58 (2006.01)
G06Q 30/02 (2012.01)

(52) U.S. Cl.
CPC ......... G06Q 50/01 (2013.01); G06Q 30/0214 (2013.01); G06Q 30/0269 (2013.01); G06Q 30/0273 (2013.01); H04L 51/32 (2013.01)

(58) Field of Classification Search
CPC combination set(s) only.
See application file for complete search history.

(56) References Cited

U.S. PATENT DOCUMENTS

| 2004/0019645 | A1* | 1/2004 | Goodman | G06Q 10/107 709/206 |
| 2004/0193691 | A1* | 9/2004 | Chang | G06Q 10/107 709/206 |
| 2006/0041505 | A1* | 2/2006 | Enyart | G06Q 20/102 705/40 |
| 2008/0189169 | A1* | 8/2008 | Turpin | G06Q 30/02 705/7.33 |
| 2009/0254456 | A1* | 10/2009 | Sarbaev | G06Q 10/10 705/26.1 |

* cited by examiner

Primary Examiner — Gabrielle A McCormick

(57) ABSTRACT

Techniques to promote messages in a social networking services to increase communication opportunities while throttling unsolicited messages are described. In one embodiment, an apparatus may have a message generation component and a message delivery component. The message generation component may be operative to receive a request from a first member of a social networking service (SNS) to send a message for a second member of the SNS. The message delivery component may be operative to deliver the message to one of multiple mailboxes for the second member based on a tiered payment schedule. The tiered payment schedule may include a first parameter to represent a relationship type between the first and second members, a second parameter to represent a subscriber tier for the second member, and a third parameter to represent a promotional cost associated with the subscriber tier. Other embodiments are described and claimed.

30 Claims, 17 Drawing Sheets

*Logic Flow 1000*

TECHNIQUES TO PROMOTE MESSAGES

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to promote messages. Some embodiments are particularly directed to techniques to promote messages in a social networking services to increase communication opportunities while throttling unsolicited messages. In one embodiment, for example, an apparatus may have a message generation component and a message delivery component. The message generation component may be operative to receive a request from a first member of a social networking service (SNS) to send a message for a second member of the SNS. The message delivery component may be operative to deliver the message to one of multiple mailboxes for the second member based on a tiered payment schedule. The tiered payment schedule may include a first parameter to represent a relationship type between the first and second members, a second parameter to represent a subscriber tier for the second member, and a third parameter to represent a promotional cost associated with the subscriber tier. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
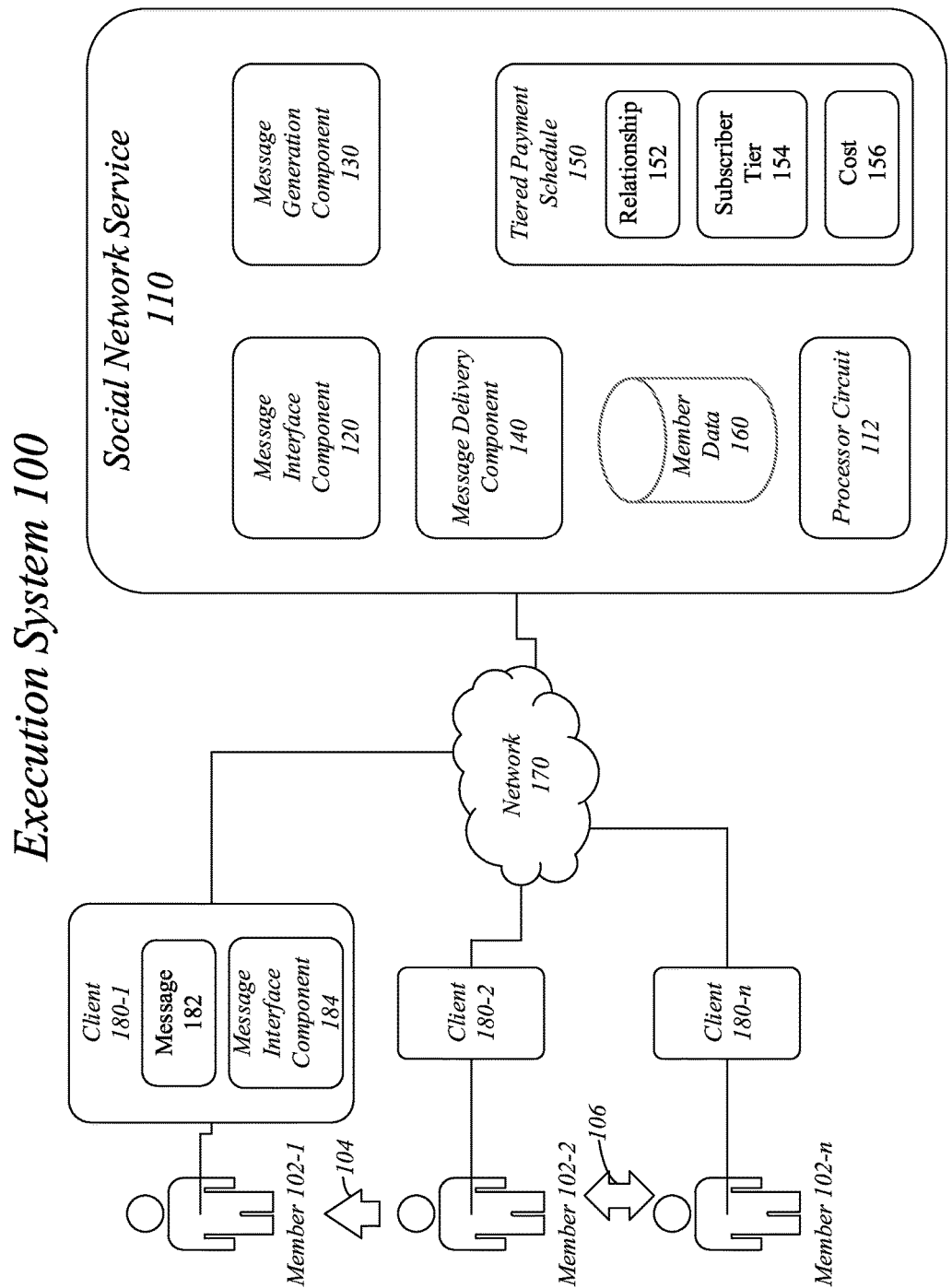
FIG. 1 illustrates an embodiment of an execution system to provide message promotion services.

Various embodiments are directed to techniques to promote messages in a social network service to increase communication opportunities while throttling unsolicited messages. Social network services (SNS) provide ways for members to form and maintain personal, professional, commercial and other relationships among the members. SNSs also provide ways for members to produce and/or share content with other members, and to communicate in both real-time and with messages. Many members, however, may find unsolicited communications from strangers annoying, disruptive, or otherwise undesirable, much like junk postal mail, marketing telephone calls, or unsolicited email, e.g. "spam". Nevertheless, various members may have a legitimate reason to contact a stranger within a SNS, for example, to return a found item, or for business recruiting. Some SNS may allow strangers to send messages to other members, and may route such messages to a secondary mailbox that can be easily ignored by the receiving member. Providing members with a way to promote a message, for a cost, to a stranger such that the message is delivered to a mailbox that is more likely to be seen, may provide a balance between legitimate communication between strangers and reducing undesired communication. As a result, the embodiments can improve the quality of communication and user experience in the SNS for its members.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an execution system 100. In one embodiment, the execution system 100 may be computer-implemented and have a social network service 110 comprising one or more components. Although the execution system 100 shown in FIG. 1 has a limited number of elements in a certain topology, it may be appreciated that the execution system 100 may include more or fewer elements in alternate topologies as desired for a given implementation.

Execution system 100 may include social network service (SNS) 110. SNS 110 may be arranged to provide social network services for its members, e.g. members 102-1, 102-2, . . . 102-n, collectively, members 102. Members 102 may interact with SNS 110 via client devices, e.g. clients 180-1, 180-2, . . . 180-n, communicating with SNS 110 using network 170. The social network services may include, without limitation, finding members, forming relationships with members, sharing content, providing communication between and among members, and so forth. SNS 110 may include a message interface component 120, a message generation component 130, and a message delivery component 140. SNS 110 may also store and use data, such as tiered payment schedule 150 and member data 160. Some or all of the components of SNS 110 may provide their respective functions when executing on processor circuit 112.

Members 102 of SNS 110 may have a variety of relationship types to describe their relationships to one another. For example, some members may have one-way relationships with other members, in a subscriber-producer type of relationship, as indicated by arrow 104. The producer member, e.g. member 102-2, may publish content that its subscribers can see. Any content published by the subscribers, e.g. member 102-1, is not visible to the producer member. The one-way relationship may be used, for example, by celebrities, politicians, public figures, businesses, products, and so forth.

In another example, members who know each other may have a two-way relationship, also referred to as a "friend" relationship, as indicated by arrow 106. Friends can generally see each other's personal information and published content, and messages to friends are typically delivered to a primary mailbox accompanied by a notification that a message has been received. Members who have no relationship to each other are referred to herein as "unrelated," "not related" or having "no relationship." Unrelated members typically cannot see much, if any, of the other's personal information or published content. Messages to an unrelated member may be delivered, if messaging is allowed at all, to a secondary or low priority mailbox without notification to the recipient.

Execution system 100 may allow a member to promote a message to an unrelated member. Promoting a message refers to changing the destination of the message from a secondary or lower priority mailbox of the unrelated recipient member to a primary or higher priority mailbox of the unrelated recipient member, usually for a cost. The cost to promote a message to a recipient may be based on a tier in a tiered payment schedule, which accounts for various characteristics of the recipient. For example, the type of relationship between the sender and recipient may affect the cost. The number of other members connected to the recipient may also, or alternatively, affect the cost.

In order to balance allowing messaging promotion when it is needed with preventing "spamming," for example, by a sender who can afford to send a lot of messages to one recipient, a throttling procedure may also be applied. For example, the recipient may be assigned temporarily to a different tier having a higher cost when some threshold number of promoted messages is received in a time period. Message promotion for the recipient may be blocked entirely for a time period when some threshold number of promoted messages is received.

Returning to SNS 110, message interface component 120 may provide a user interface on a client that allows a member to compose and send a message, e.g. message 182. Message interface component 120 may, for example, provide an interface to search for or enter a name of a recipient, a message body area, a file attachment interface, a gift attachment interface, and information about promoting a message to a higher priority mailbox. Message interfaces are described in more detail with respect to FIGS. 7 and 8. Message interface component 120 may be provided, for example, to a client application, such as a web browsing application executing on a client 180, that communicates with SNS 110 over network 170. SNS 110 may provide a client-side message interface component 184. Message interface component 184 may be a stand-alone application executing on client 180, or may be a component of an application executing on client 180.

Message generation component 130 may receive a request from a member 102 to send a message to another member 102 of SNS 110. Message generation component 130 may receive message information from message interface component 120 or 184. Message generation component 130 may generate and format the message in preparation for delivery to a mailbox of the recipient.

Message delivery component 140 may deliver the message, received from message generation component 130, to one of multiple mailboxes for the recipient member based on tiered payment schedule 150. Message delivery component 140 is described further with respect to subsequent drawings.

Tiered payment schedule 150 may include a first parameter to represent a relationship type 152 between the sender and recipient members, a second parameter to represent a subscriber tier 154 for the recipient member, and a third parameter to represent a promotional cost 156 associated with the subscriber tier 154. Relationship type 152 may determine a subscriber tier 154 for a member. For example, when member 102-1 and member 102-n have no relationship, either member may be assigned to a subscriber tier 154 that applies to strangers, if one of the two wishes to send a message to the other member. If member 102-1 and member 102-2 have a one-way relationship, one or both members may be assigned to a different subscriber tier 154, relative to a subscriber tier 154 for unrelated members. Members having a two-way relationship may have a third, different subscriber tier assigned to them, or may bypass the tiered payment schedule entirely. A subscriber tier 154 may be assigned to a member according to various factors. For example, a member may be assigned to a subscriber tier according to how many other members subscribe to that member. That is, the subscriber tier for member 102-2 may depend on how many members, such as member 102-1, subscribe to them. The subscriber tier 154 may be assigned according to how many friends, e.g. two-way relationships, a member has. In some cases, a member may be assigned to a different subscriber tier temporarily, for example, in response to receiving a message. The embodiments are not limited to these examples.

SNS 110 may store and use member data 160. Member data 160 may include any data related to a member's participation in SNS 110. Examples of member data 160 may include, without limitation, member identification information; profile information; relationships, e.g. friends, subscribers, members subscribed to; shared content; published content; preferences; settings; and mailboxes.

The illustrated components of SNS 110 may be housed together on one apparatus or may be distributed at least in part on a plurality of apparatuses. The plurality of apparatuses may be in one geographic location or separate in various geographic locations.

FIGS. 2-5 show message flows for system 100. In FIGS. 2-5, similarly named and numbered elements may represent the same element across figures, or may represent different instances of an element from system 100. For example, member 102-1 from FIG. 1 may be the same person as member 202-1 in FIG. 2, or may be a different member of SNS 110.

Figure 2:
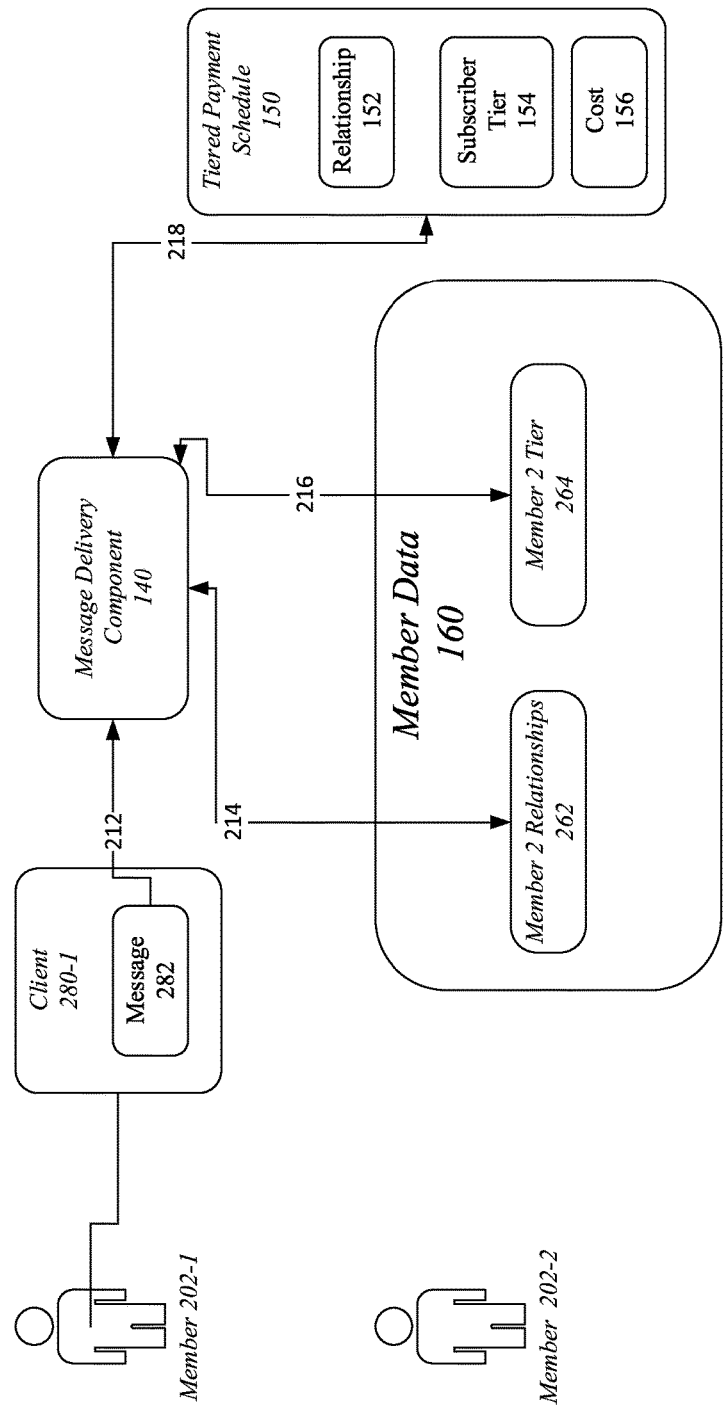
FIG. 2 illustrates an embodiment of a first message flow.

FIG. 2 illustrates an embodiment of a message flow 200 for the system 100, illustrating the communication of several of the components of system 100 when a member, e.g. member 202-1, tries to send a message 282 to an unrelated member 202-2. The components illustrated in FIG. 2 may the same as, or analogous to, the components of system 100 as illustrated in FIG. 1. For example, message delivery component 240 may be the same as message delivery component 140. Members 202-1 and 202-2, for the purpose of illustration in FIG. 2, have no relationship in SNS 110.

As shown in FIG. 2, member 202-1 may use client 280-1 to compose a message 282. Prior to, during, or after the content of message 282 is composed, message delivery component 140 may receive a request or notification that a message to member 202-2 is requested, shown as request 212. This may occur, for example, once member 202-1 enters the name of member 202-2 in an address field, or selects a user interface element that is displayed in proximity to information about member 202-2 to send a message to member 202-2.

Message delivery component 140 may then request or look-up, in request 214, what relationship member 202-1 has to member 202-2 from member data 160. Message delivery component 140 may, for example, look in member 2 relationships 262 to see if member 202-1 has a relationship with member 202-1. Message delivery component 140 may then determine that members 202-1 and 202-2 have no relationship in the SNS. Message delivery component 140 may next request or look-up, in request 216, in what subscriber tier member 202-2 is currently placed, from member data 160. Message delivery component 140 may, for example, look at member 2 tier 264 to identify the subscriber tier of member 202-2.

Message delivery component 140 may use the fact that members 202-1 and 202-2 have no relationship, and the current subscriber tier, to look up in tiered payment schedule 150 what the cost 156 of promoting message 282 is, in request 222.

Figure 3:
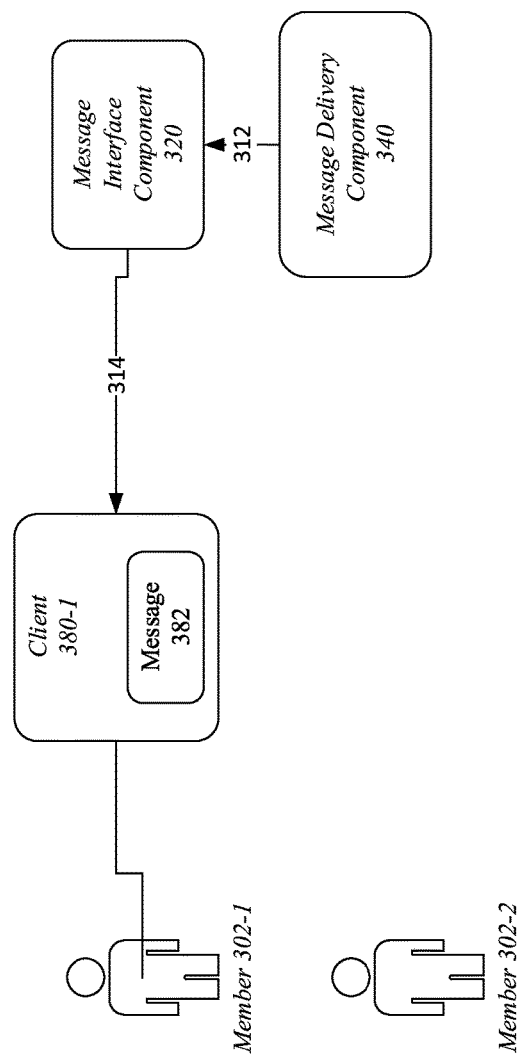
FIG. 3 illustrates an embodiment of a second message flow.

FIG. 3 illustrates an embodiment of a message flow 300 for the system 100, illustrating the communication of several of the components of system 100 when a member, e.g. member 302-1 wishes to send a message 382 to an unrelated member 302-2. The components illustrated in FIG. 3 may the same as, or analogous to, the components of system 100 as illustrated in FIGS. 1 and 2. Message flow 300 may occur after member 302-1 has begun a messaging process to send message 382. For example, member 302-1 may have selected a user interface element to send a message to member 302-2. Alternatively, member 302-1 may have opened a blank message user interface and may have filled in a recipient field with member 302-2 information. Message flow 300 may occur at any time after the recipient of message 382 is specified and before message 382 is delivered to a mailbox of member 302-2.

As shown in FIG. 3, message delivery component 340 may send a control directive 312 to message interface component 320 to present a user interface view to client 380-1. The user interface view may include an option to promote message 382 to a primary mailbox of member 302-2 with payment of a promotional cost associated with the subscriber tier of member 302-2. In an embodiment, message flow 300 may occur when message delivery component 140 determines, according to tiered payment schedule 150, that member 302-1 and 302-2 are not related and that a message between them may be promoted for a cost 156.

In response to control directive 312, message interface component 320 may present the user interface view to member 302-1 via client 380-1. The user interface view may be separate from a message composition interface, or may be incorporated into a message composition interface. The user interface view may include information such as a statement that message 382 will be delivered to a secondary or lower priority mailbox because member 302-2 does not know member 302-1, the option to promote the message for the cost from the tiered payment schedule 150, and selection options to promote the message or not to promote the message.

Figure 4:
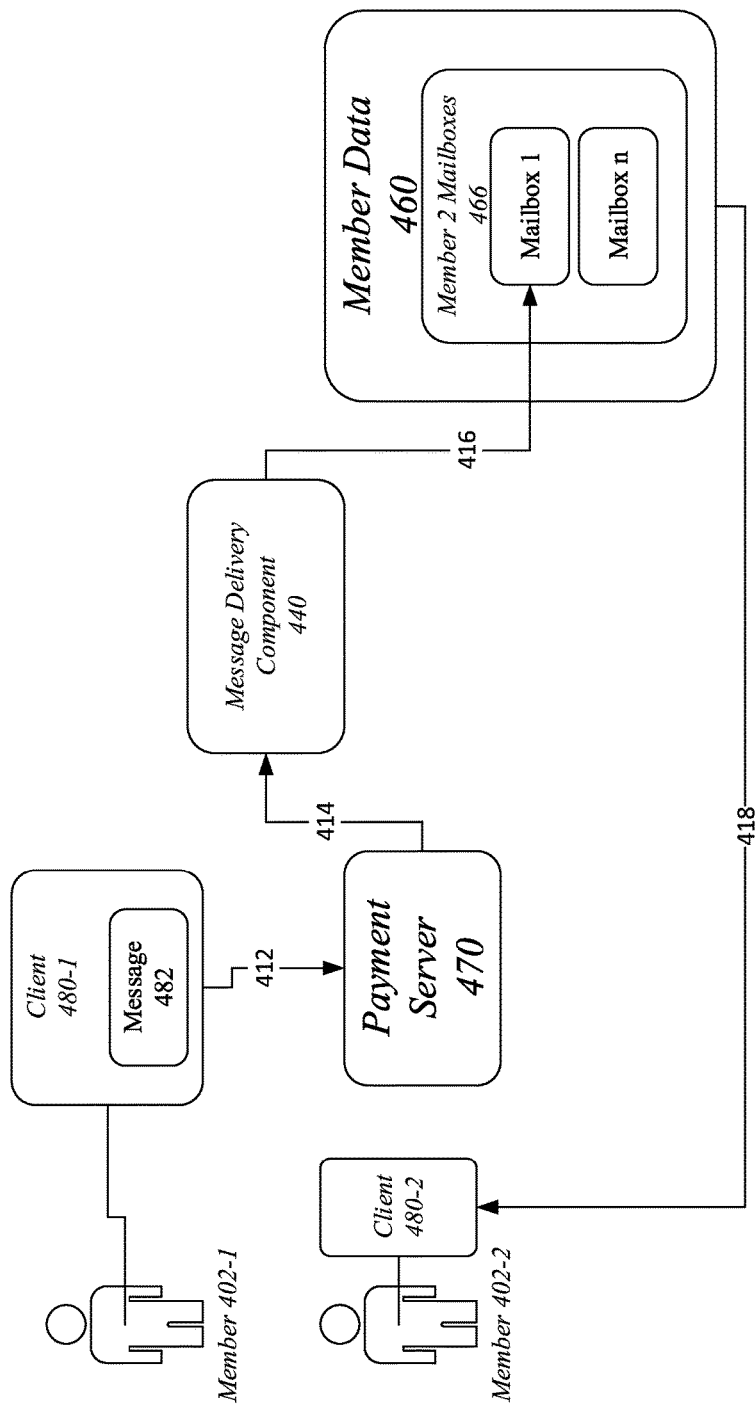
FIG. 4 illustrates an embodiment of a third message flow.

FIG. 4 illustrates an embodiment of a message flow 400 for the system 100. As shown in FIG. 4, when member 402-1 selects to pay to promote message 482, member 402-1 may submit payment information to a payment server 470 with payment instructions 412. The payment information may include, for example, an account number corresponding to a bank account, a credit card account, an electronic payment system account and so forth. The payment information may also include the cost to promote the message, as determined, for example, from tiered payment schedule 150.

Payment server 470 may be any server, device, service, or other system capable of receiving electronic payment instructions from client 480-1 and of transferring funds from an account associated with member 402-1 to SNS 110 or to an account associated with SNS 110.

Message delivery component 440 may receive a control directive 414 from payment server 470 representing payment authorization of the promotional cost associated with the subscriber tier of member 402-2. Control directive 414 may be confirmation that the funds were transferred, or confirmation that the fund transfer was authorized.

Upon receipt of control directive 414, message delivery component 440 may promote message 482 to one of several mailboxes 466 associated with member 402-2. In an embodiment, each mailbox 466 may be associated with a different tier in tiered payment schedule 150, and higher priority mailboxes may have higher costs associated with promotion as compared to lower priority mailboxes. In an embodiment, one mailbox of mailboxes 466 may be the lowest priority mailbox and may have no costs associated with it.

When message 482 is delivered to a mailbox 466, e.g. Mailbox 1, a display of mailboxes 466 at client 480-2 for member 402-2 may be updated, via notification 418. The updated display may show message 482 in Mailbox 1 for member 402-2. In an embodiment, notification 418 may also cause other visual or audible alerts to be displayed at client 480-2. For example, a "new message" alert, icon, text message, tone, and so forth, may be displayed or output on client 480-2, and may be displayed even if client 480-2 is not currently displaying a mailbox view interface, or any other interface to SNS 110.

Figure 5:
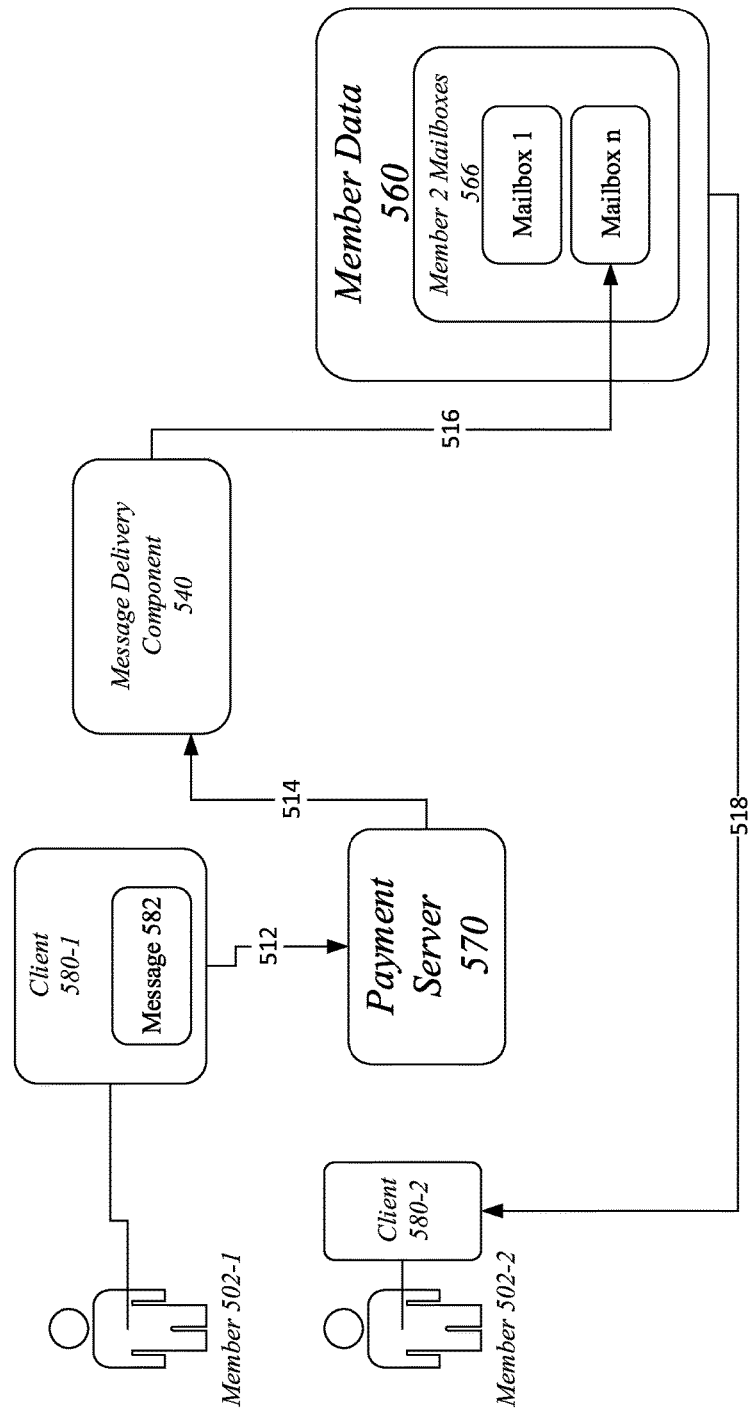
FIG. 5 illustrates an embodiment of a fourth message flow.

FIG. 5 illustrates an embodiment of a message flow 500 for the system 100. Message flow 500 is very similar to message flow 400. However, in message flow 500 member 502-1 may decide not to pay to promote message 582, or may try to pay, via payment instructions 512. The payment may fail, for any variety of reasons. As shown in FIG. 5, message delivery component 540 may receive a control directive 514 representing payment denial of the promotional cost associated with the subscriber tier of member 502-2. In an embodiment, control directive 514 may be received from client 580-1 when member 502-1 decides not to promote the message. Message delivery component 540 may demote message 582 to a secondary mailbox of mailboxes 566, e.g. Mailbox n, of the member 502-2 in response to the payment denial, or absence of payment.

When message 582 is demoted to a mailbox 566 in member data 560, e.g. Mailbox n, a display of mailboxes 566 at client 580-2 for member 502-2 may be updated, via notification 518. The updated display may show message 582 in Mailbox n for member 502-2. In contrast to message flow 400, a demoted message 582 may not produce any other visual or audible alerts to be displayed at client 580-2. In an embodiment, member 502-2 may have to select Mailbox n to see its contents and message 582. This feature may reduce the intrusiveness of unsolicited messages.

Figure 6:
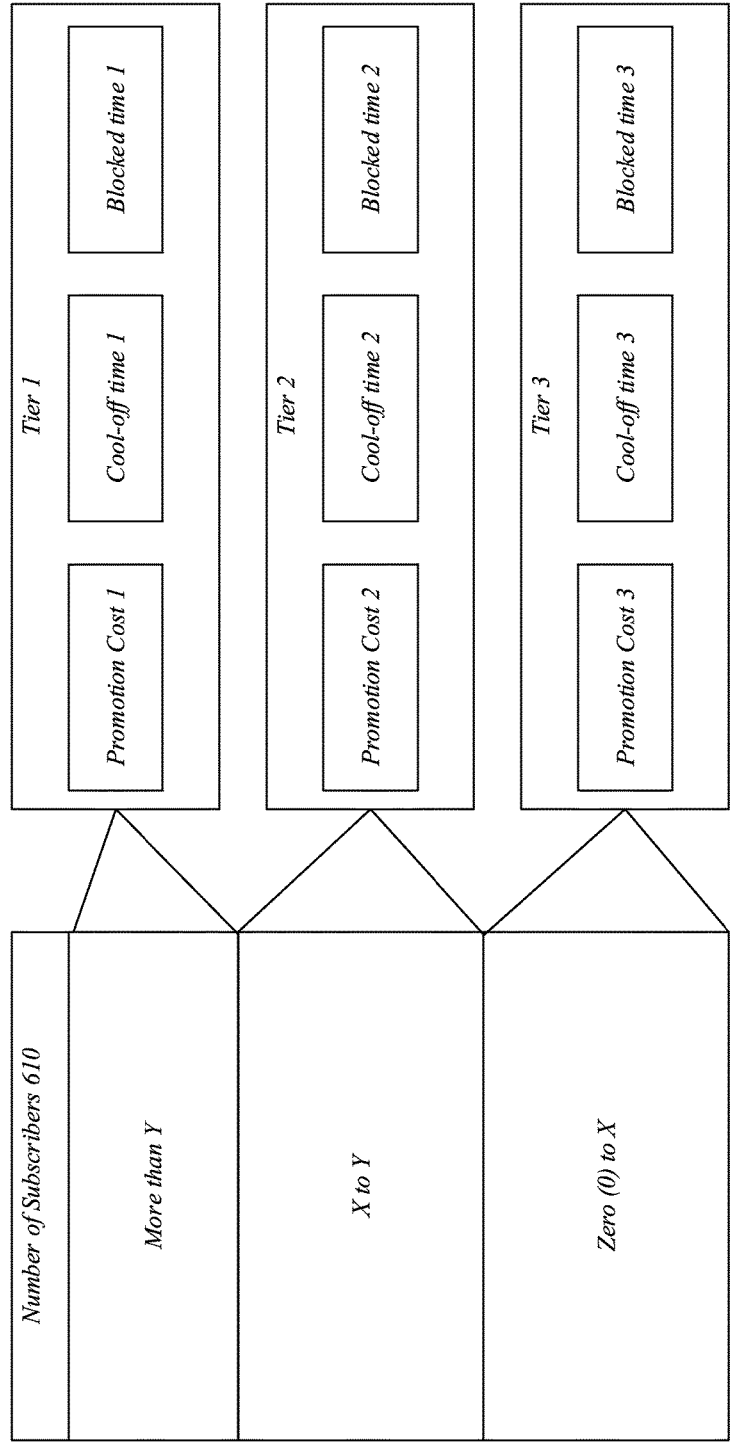
FIG. 6 illustrates an embodiment of a tiered payment schedule.

FIG. 6 illustrates an embodiment of a tiered payment schedule 600 for the system 100. Tiered payment schedule 600 may be an example of tiered payment schedule 150. As shown in FIG. 6, tiered payment schedule 600 has three tiers: tier 1, tier 2, and tier 3, however more or fewer tiers may be used. In an embodiment, a subscriber tier may indicate a range of subscribers for a member. That is, the number of subscribers 610 that a member has may determine to what tier the member is assigned. For example, a member having no subscribers or a number of subscribers up to X, may be assigned to the lowest tier, in this example, tier 3. The number X may be any positive integer, and may be selected to include some percentile of the total membership of SNS 110. For example, it may be the case that 98% of the members of SNS 110 have fewer than 1000 subscribers, and of those 98% perhaps only 1% have any subscribers at all. In that case, X may be set to 1000.

A member having more than X but fewer than Y number of subscribers may be assigned to a tier higher than the lowest tier, e.g. tier 2, but lower than a highest tier, where Y is a positive integer larger than X. Tier 2 may be assigned, for example, to the $99^{th}$ percentile of members.

A member having more than Y subscribers may be assigned to the highest tier, e.g. tier 1. Tier 1 may represent the $99.99^{th}$ percentile, for example. Tier 1 may typically apply to public figures, celebrities, and the like.

Alternatively, in an embodiment, the highest and lowest tiers may be assigned according to a member's number of subscribers, while the intermediate tier(s) may be reserved for a throttling operation. For example, tier 3 may be assigned to all members having fewer than, for example, 25,000 subscribers, while tier 1 may be assigned to all members having more than 25,000 subscribers. Tier 2 may be assigned temporarily to a tier 3 member when that member receives a promoted message. Similarly, a tier 1 member may be reassigned to tier 2 if they receive fewer promoted messages than a threshold within some specified time period.

Each tier in tiered payment schedule 600 may have various data parameters associated with it. For example, a tier, e.g. tier 2, may have a promotion cost, a cool-off time and a blocked time associated with it. Promotion cost, e.g. promotion cost 2, may specify the cost of promoting a message to a member assigned to tier 2. Cool-off time, e.g. cool-off time 2, may specify a time period during which promoted message to the member may be counted. At the end of the cool-off time, if the number of promoted messages received is less than a threshold, the member may be reassigned to a lower tier. Blocked time, e.g. blocked time 2, may specify a time period during which the member may not receive any promoted messages.

In an embodiment, the promotion cost of a higher tier may be higher than the promotion cost of a lower tier, e.g. promotion cost 1 is larger than promotion cost 2, which is in turn larger than promotion cost 3. Similarly, the cool-off time of a higher tier may be longer than the cool-off time of a lower tier, e.g. cool-off time 1 may be longer than cool-off time 2. Blocked time 1 may be longer than blocked time 2 and blocked time 3.

In some cases, some of the parameters may be set to zero. For example, the cool-off time for the lowest tier may be set to zero because there is no lower tier to which reassignment is possible. By way of example, for tier 1, promotion cost 1 may be $15, cool-off time 1 may be 90 continuous days, and blocked time 1 may be 30 days. For tier 2, promotion cost 2 may be $5, cool-off time 2 may be 30 continuous days, and blocked time 1 may be 7 days. For tier 3, promotion cost 3 may be $1, cool-off time 3 may be 0 days, and blocked time 1 may be 7 days. SNS 110 may adjust any of these parameters as desired to maintain the balance of allowing legitimate communication while curbing unsolicited undesirable messages. In addition, tiers may be added or removed from tiered payment schedule 600 to maintain such balance.

While tiered payment schedule 600 shows that number of subscribers 610 determines the assignment of a tier to a member, other measures or ranges of data may be used. For example, the number of friends of a member may be used to map the member to a tier, the number of messages sent to the member's lowest priority mailbox in a recent time period, how often or how recently the member last connected to SNS 110, and so forth. The embodiments are not limited to these examples.

Figure 7:
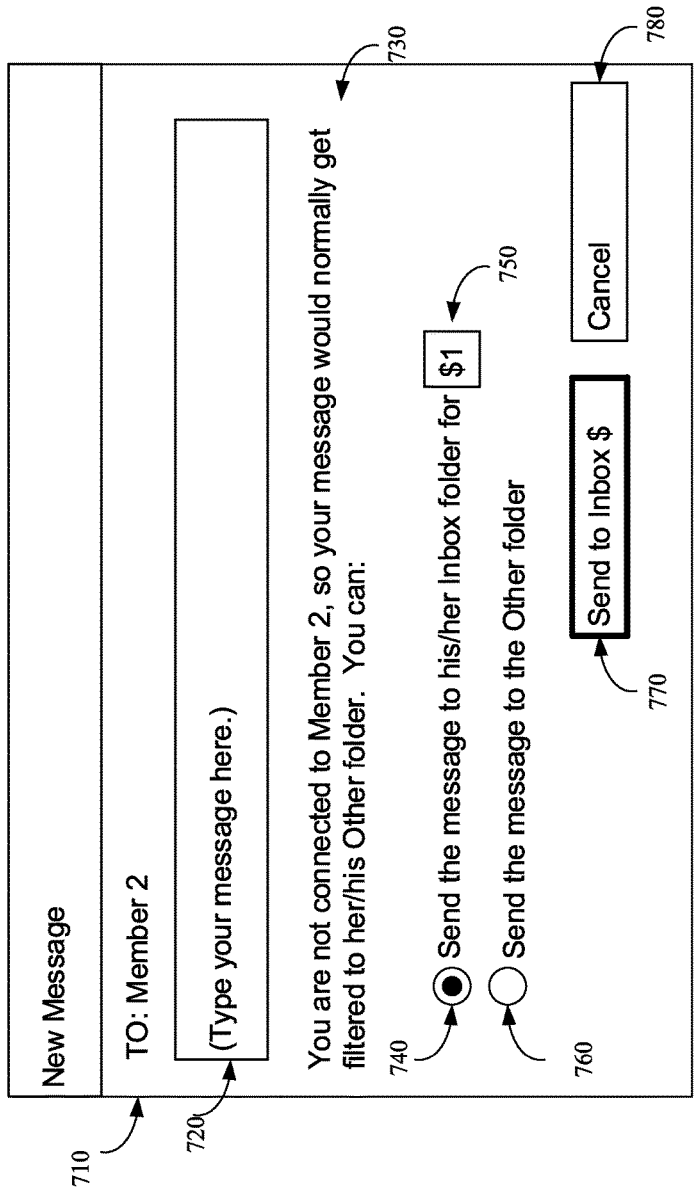
FIG. 7 illustrates an embodiment of a message promotion user interface.

FIG. 7 illustrates an embodiment of a message promotion user interface (UI) 700 for the system 100. Message promotion UI 700 may be an example of a UI that message interface component 120 or 184 may present to a member on a client such as client 180-1. As shown in FIG. 7, message promotion UI 700 may include or be incorporated with a message composition interface. For example, message promotion UI 700 may include a recipient field 710, in which a sending member may add one or more intended recipients. Recipients may be added to recipient field 710, for example, by their user name in SNS 110, by an email address, a telephone number, or any other identifying information. In some cases, recipient field 710 may be pre-populated with a recipient's name, for example, if the sending member selected a "send a message" option from a view in SNS 110 associated with the recipient, e.g. from a profile page, or a search results page. In the illustrated example, the recipient is "Member 2."

Message promotion UI 700 may include a message composition field 720. Message composition field 720 may allow the sending member to compose a message. For example, and without limitation, message composition field 720 may receive text from a keyboard, text from a voice recognition application, writing from a touchscreen or stylus, image and/or video data from a camera, hyperlinks to web pages on a network, links to electronic transactions such as gifts purchased electronically, and so forth.

Message promotion UI 700 may include an alert message 730. Alert message 730 may provide information that the sender and recipient are not related in SNS 110, and/or that without promotion, the message will be delivered to a lower priority mailbox, e.g. an "Other" folder or mailbox.

Message promotion UI 700 may include selection options to allow the sending member to promote the message, with option 740, or to demote the message to the lower priority mailbox, with option 760. Option 740 may include the cost 750, which may be the promotion cost 156 received from tiered payment schedule 150 according the subscriber tier 154 of Member 2, and the relationship 152 between the sending member and Member 2.

When option 740 is selected, as shown in FIG. 7, message promotion UI 700 may provide the option 770 to promote the message, and the option 780 to cancel the send. When option 770 is selected by the sending member, another UI (not shown) may be presented to collect payment information, e.g. payment information 412, prior to promoting the message to the primary mailbox. When option 780 is selected, the message is discarded and message promotion UI 700 is closed. Although two message promotion options are illustrated in FIG. 7, message promotion UI 700 may present options for more than two mailboxes, where each mailbox may have a different cost associated with promoting the message to that mailbox.

Figure 8:
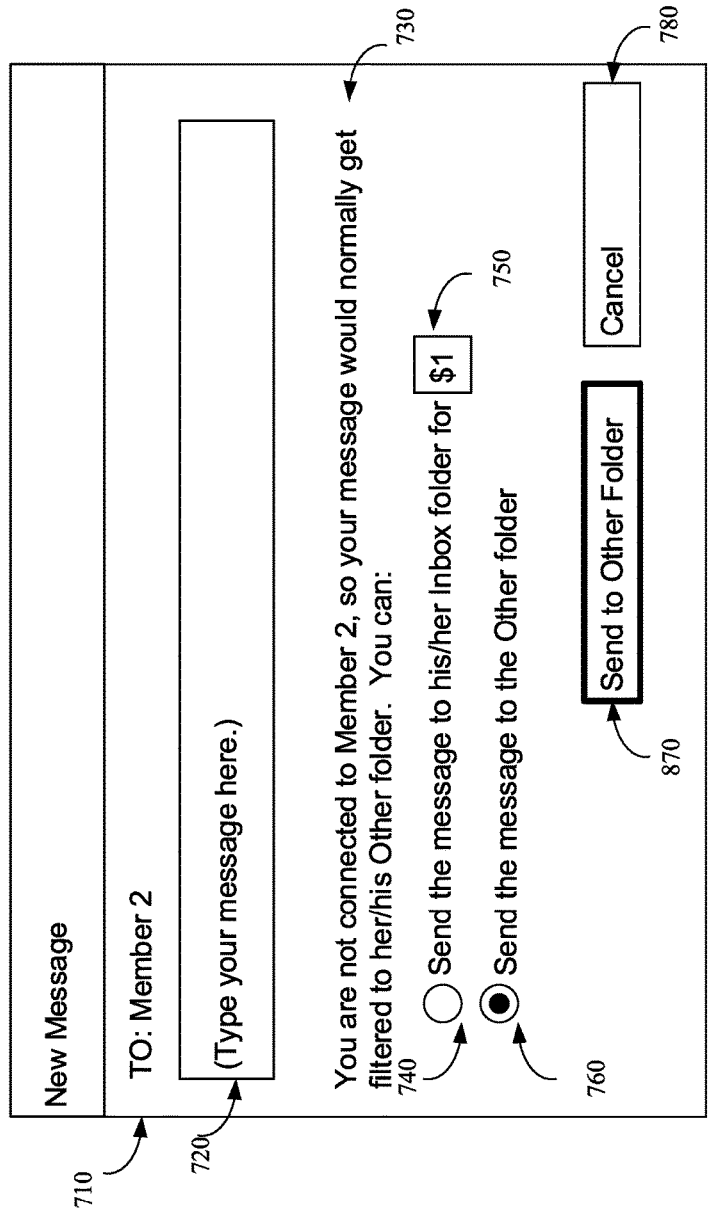
FIG. 8 illustrates a second embodiment of a message promotion user interface.

FIG. 8 illustrates an embodiment of a message promotion user interface (UI) 800. Message promotion UI 800 may represent message promotion UI 700 from FIG. 7, when option 760 is selected. When option 760 is selected, option 770 changes to option 870, which when selected, demotes the message to the lower priority mailbox, e.g. the Other folder. When option 870 is selected, no payment is collected, and the message may be delivered to the Other folder for Member 2, for example, as depicted in FIG. 5.

Figure 9:
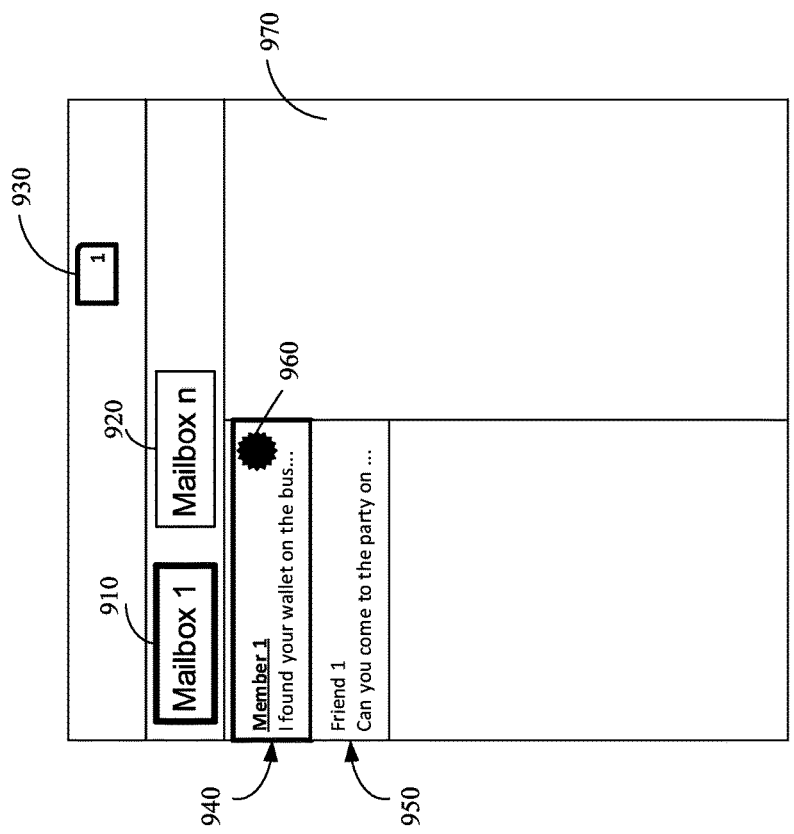
FIG. 9 illustrates an embodiment of a mailbox user interface.

FIG. 9 illustrates an embodiment of a mailbox user interface (UI) 900. Mailbox UI 900 may represent what is displayed on a client, e.g. client 180-2, when a member interacts with SNS 110 to view the contents of mailboxes of the member. Mailbox UI 900 may allow the member to select which mailbox contents to view, for example, with mailbox selectors 910 and 920. As illustrated in FIG. 9, mailbox selector 910, for the primary mailbox, is selected.

Mailbox UI 900 may include a notification 930 when new and/or unread messages have been delivered to the primary mailbox. Notification 930 may include, for example, a visually highlighted indication, a number of new or unread messages, an icon, a symbol, and so forth.

Mailbox UI 900 may display a new message preview 940, and a read message preview 950. A message preview may display information identifying the sender of the message, and some message content. The message content may include a title or subject of the message and/or a portion of the beginning of the message. In an embodiment, a new message preview may be visually highlighted to distinguish it from read messages. For example, new message preview 940 has a bolder border compared to read message preview 950. The sender information may be bold and/or underlined or otherwise highlighted. In an embodiment, a symbol, e.g. symbol 960, may be displayed with a new message preview to indicate that the message is a promoted message. Mailbox UI 900 may display the full contents of a message, for example, in pane 970, or in a new window, when the message preview is selected by the viewing member via a control directive to the client.

In an embodiment, a message previously sent to the lower priority mailbox of a member may be promoted to a higher priority mailbox by the sender. In the sender's mailbox view, for example, the sender may see the previously sent message as a sent message or in a sent messages mailbox. The sender may be able to select the message and select an option to promote the message to a higher priority mailbox. Promoting a previously sent message may take place in a substantially similar manner as promoting a new message. When successful, promoting a previously sent message may cause the message to be moved from the recipient's lower priority mailbox to the higher priority mailbox, similar to the delivery of a new promoted message.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
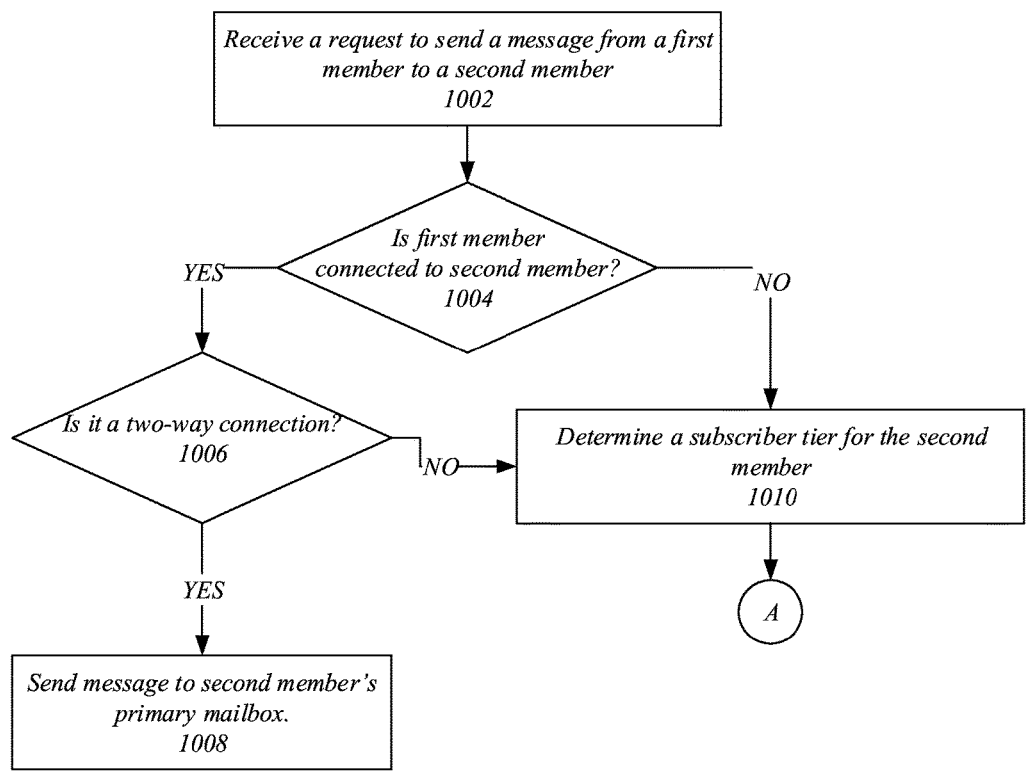
FIG. 10 illustrates an embodiment of a logic flow for the system of FIG. 1.

FIG. 10 illustrates one embodiment of a logic flow 1000 for the system of FIG. 1. The logic flow 1000 may be representative of some or all of the operations executed by one or more embodiments described herein.

In the illustrated embodiment shown in FIG. 10, logic flow 1000 may receive a request to send a message from a first member of a SNS to a second member of the SNS at block 1002. For example, message delivery component 140 may receive the request from at least one of message interface component 120, message generation component 130, or message interface component 184.

Logic flow 1000 may determine whether the first member is connected to the second member at block 1004. For example, message delivery component 140 may request from, or look up in, member data 160 whether the first and second members have a relationship in SNS 110.

Logic flow 1000 may determine whether the connection between the two members is a two-way connection at block 1006 when it is determined that the two members are connected. For example, the first and second members may have a two-way relationship or may have a one-way relationship. The type of relationship may be determined from member data 160.

Logic flow 1000 may deliver the message to the second member's primary mailbox at block 1008 when it is determined that the two members have a two-way connection. For example, message delivery component 140 may deliver the message directly to the second member's Inbox, or mailbox 1, or other primary mailbox without further action from the first member, because the two members are "friends. It may be presumed that messages from "friends" are desirable and that no limitations or throttling of messages from friends is needed or wanted.

Logic flow 1000 may determine a subscriber tier for the second member at block 1010 when either the two members are not connected, or when a connection between them is not a two-way connection. For example, if the two members have no relationship, they may be strangers to each other. If one member is a subscriber or follower of the other member, they may still be strangers to each other for the purposes of messaging. For these relationship types, message delivery component 140 may determine the subscriber tier for the second member, i.e. the recipient, for example, from member data 160. The subscriber tier for the second member may have been determined previously as a function of the number of subscribers to the second member, the number of friends the second member has, or by other criteria. Logic flow 1000 continues in logic flow 1100 from point A.

Figure 11:
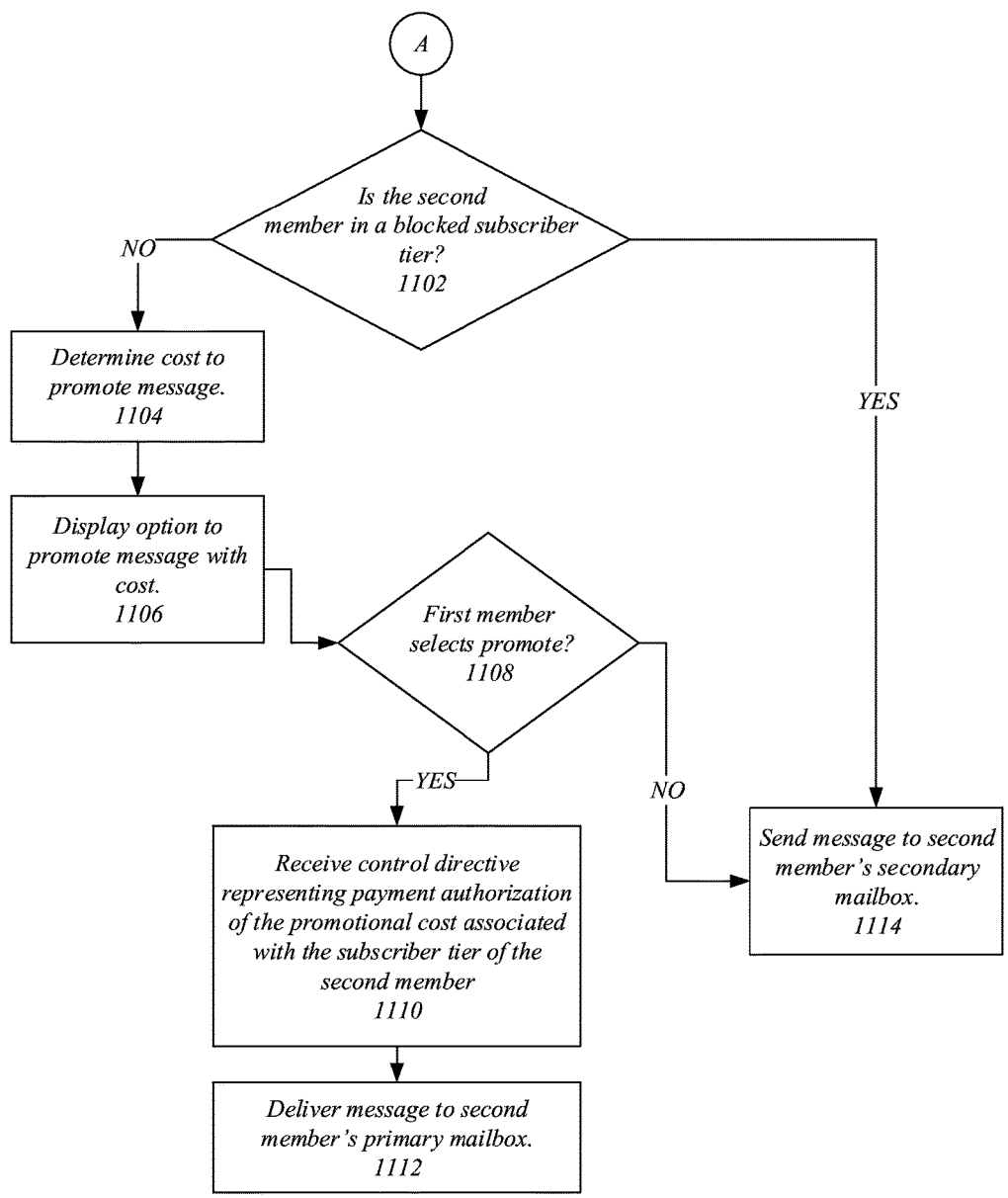
FIG. 11 illustrates an embodiment of a logic flow for the system of FIG. 1.

FIG. 11 illustrates an embodiment of a logic flow for the system of FIG. 1. Logic flow 1100 may continue logic flow 1000 from point A. Once the subscriber tier for the second member is determined, at block 1010, logic flow 100 may determine whether the second member in a blocked subscriber tier at block 1102. A member may be in a blocked subscriber tier if the member has received at least one promoted message within the blocked time of the subscriber tier assigned to the member when the promoted message was received. For example, if the member was in Tier 2 of tiered payment schedule 600 when a promoted message was received, the member may be assigned to a blocked subscriber tier for the duration of blocked time 2.

Logic flow 1100 may determine the cost to promote the message at block 1104 when the second member is not in a blocked subscriber tier. For example, message delivery component 140 may use tiered payment schedule 150 to determine promotion cost 156 according to the subscriber tier 154 for the second member.

Logic flow 1100 may display an option to promote the message for the determined cost at block 1106. For example, message interface component 120 or 184 may cause message promotion UI 700 to be displayed on a client 180 for the first member. The display may be, for example, a part of a client application in communication with SNS 110, or part of a web browser interface.

Logic flow 1100 may determine whether the first member selects the option to promote the message in block 1108. For example, message interface component 120 or 184 may determine whether the first member selected option 770 from message promotion UI 700.

Logic flow 1100 may receive a control directive representing payment authorization of the promotion cost at block 1110. For example, message delivery component 140 may receive the control directive from a payment server 470 once the first member has provided payment information and the funds for the promotion cost are received.

Logic flow 1100 may promote the message by delivering the message to the second member's primary or higher priority mailbox at block 1112. For example, message delivery component 140 may place the message in Mailbox 1 for the second member, or to a mailbox that has a higher priority than the lowest priority mailbox. In an embodiment, a notification may be generated to inform the second member that there is a new message in the mailbox. In another embodiment, promoted messages may not generate notifications.

Logic flow 1100 may demote the message by sending it to the second member's secondary or lowest priority mailbox in block 1114, either when the second member is in a blocked subscriber tier or when the first member decides not to promote the message.

Figure 12:
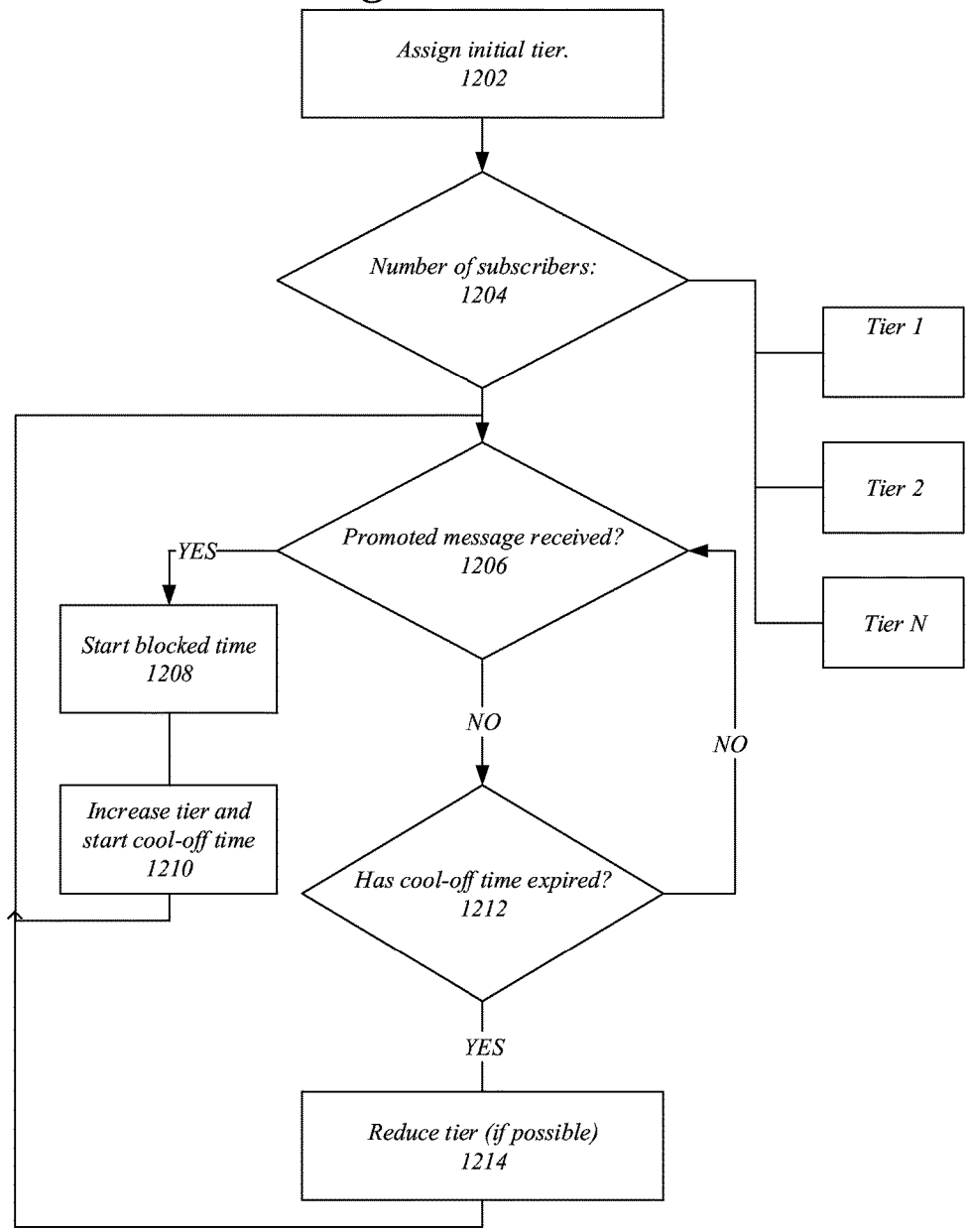
FIG. 12 illustrates an embodiment of a logic flow for the system of FIG. 1.

FIG. 12 illustrates an embodiment of a logic flow for the system of FIG. 1. Logic flow 1200 may represent the assignment of a member of SNS 110 to a subscriber tier 154. Logic flow 1200 may take place or be executed independently of the message flows described herein with respect to a message created and promoted. Logic flow 1200 may operate continuously, periodically, or when subscriber information about a member changes.

Logic flow 1200 may assign an initial tier to a member at block 1202 according to a number of subscribers to the member determined at block 1204. In this context, "initial" may refer to a determination made when a member first joins SNS 110, at the first attempt to promote a message to the member, or any time that a number of subscribers changes for the member. Additionally, while the number of subscribers is used herein as an example for determining a subscriber tier, other or additional factors may be used to determine a subscriber tier for a member.

Once a member is assigned a tier, e.g. tier 1, tier 2, or tier N, logic flow 1200 may monitor for the receipt of a promoted message for the member at block 1206. Note that the receipt of a promoted message means that the member was not in a blocked subscriber tier at the time the promoted message was received.

When a promoted message is received at block 1206, logic flow 1200 may start the blocked time for the member at block 1208. The blocked time may be set to last for the blocked time of the member's subscriber tier. For example, if the member was in Tier 3 of subscriber tier 600, the blocked time would be set to last for blocked time 3.

Logic flow 1200 may increase the subscriber tier for the member at block 1210 and start the cool-off time. For example, if the member was in Tier 3 of subscriber tier 600, the member may be assigned to Tier 2. In this context, to increase the subscriber tier may refer to assignment of a subscriber tier having, at least, a higher promotion cost associated with it. The cool-off time may be set to last for the cool-off time of the higher tier. For example, if the member was increased from Tier 3 of subscriber tier 600 to Tier 2, the blocked time would be set to last for cool-off time 2. If the member is already in the highest tier, then the member cannot be assigned an increased tier, but the cool-off time may be restarted.

When no promoted messages are received at block 1206, logic flow 1200 may determine whether the cool-off time has expired at block 1212. When the cool-off time has expired at block 1212, logic flow 1200 may reduce the subscriber tier of the member in block 1214. When the member is already in the lowest tier, blocks 1212 and 1214 may not be applicable to the member. However, if the member is, for example, in Tier 2 and does not receive any promoted messages during the cool-off time, the member may be reduced to Tier 3.

If the cool-off time has not expired in block 1212, and another promoted message is received at block 1206, then logic flow 1200 proceeds to blocks 1208 and 1210.

In an embodiment, a threshold number of promoted messages may be received during the cool-off time before the member is assigned to a higher tier. For example, a member may receive three or five promoted messages before being reassigned to a higher tier. In such an embodiment, the number of promoted messages may be counted at block 1206 and compared to threshold before proceeding to block 1208.

Figure 13:
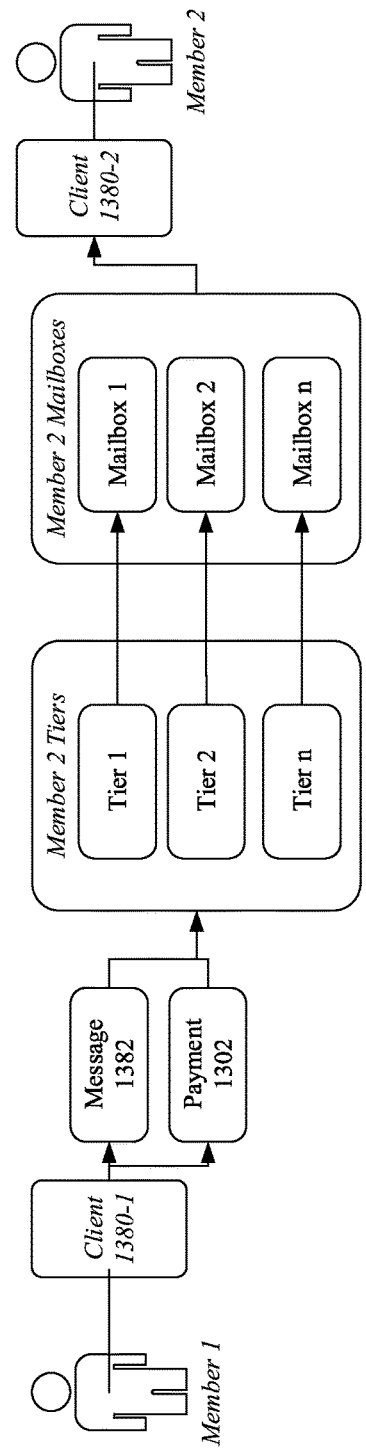
FIG. 13 illustrates an embodiment of a message flow.

FIG. 13 illustrates an embodiment of a message flow 1300. Message flow 1300 may represent the possible paths of a message from a first member to a second member in SNS 110. As illustrated, member 1 may compose a message 1382 using client 1380-1 and address message 1382 to member 2. Member 1 may also pay a payment 1302. Payment 1302 may be zero or some positive number associated with the promotion cost of a subscriber tier.

In an embodiment, the tiers in member 2 tiers may be determined according to which mailbox the message would be delivered to, rather than, or in addition to, the number of subscribers to member 2. Higher priority mailboxes may receive mail according to higher tiers which have higher promotion costs associated with them. For example, mailbox 1 may receive mail only from friends or when the cost associated with tier 1 is paid to promote the message to mailbox 1. Mailbox n may receive demoted or otherwise non-promoted mail from strangers when no promotion costs are paid, or when member 2 is temporarily in a blocked subscriber tier.

The destination mailbox for message 1382 may therefore depend on payment 1302. When payment 1302 corresponds to the cost associated with Tier 1, message 1382 may be delivered to Mailbox 1. When payment 1302 corresponds to the cost associated with Tier 2, message 1382 may be delivered to Mailbox 2, and so forth. When message 1382 is delivered to a mailbox, member 2 may view message 1382 using client 1380-2.

Figure 14:
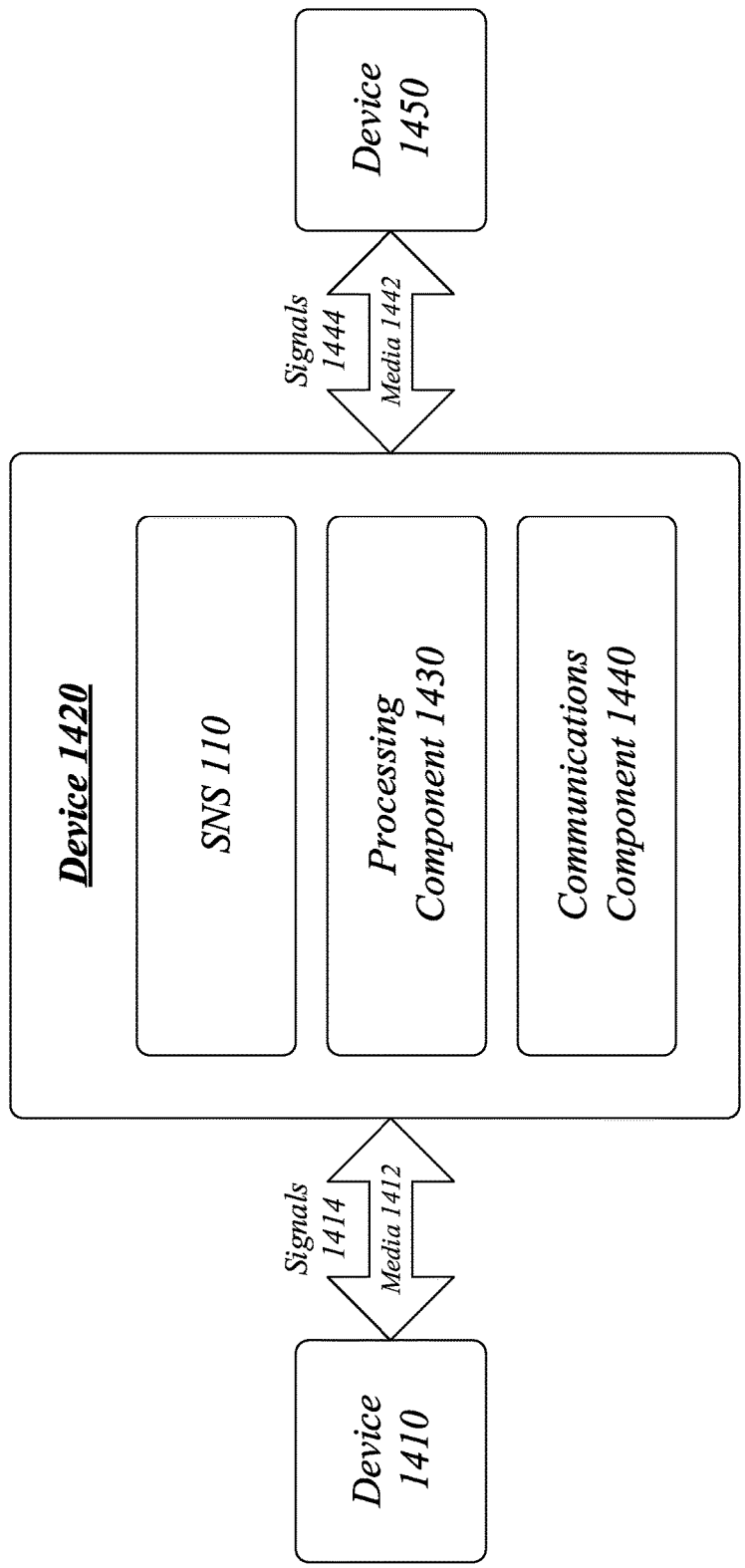
FIG. 14 illustrates an embodiment of a centralized system for the system of FIG. 1.

FIG. 14 illustrates a block diagram of a centralized system 1400. The centralized system 1400 may implement some or all of the structure and/or operations for the system 100 in a single computing entity, such as entirely within a single device 1420.

The device 1420 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1420 may execute processing operations or logic for the system 100, in particular for SNS 110, using a processing component 1430. The processing component 1430 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1420 may execute communications operations or logic for the system 100 using communications component 1440. The communications component 1440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1440 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1412, 1442 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1420 may communicate with other devices 1410, 1450 over a communications media 1412, 1442, respectively, using communications signals 1414, 1444, respectively, via the communications component 1440. The devices 1410, 1450 may be internal or external to the device 1420 as desired for a given implementation. Devices 1410, 1450, may, for example, implement clients 180 in communication with SNS 110. Devices 1440, 1450 may implement payment server 470 in communication with SNS 110. The embodiments are not limited to these examples.

Figure 15:
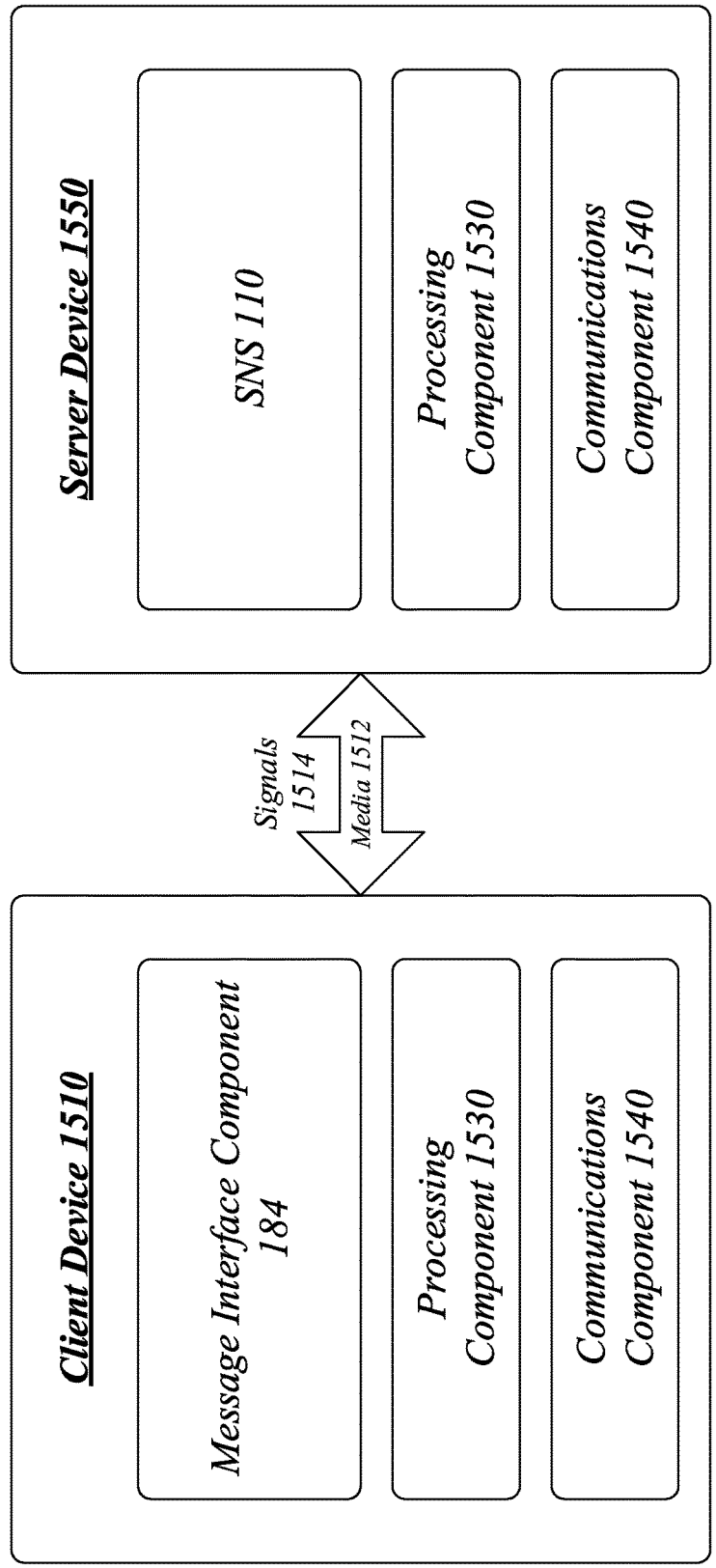
FIG. 15 illustrates an embodiment of a distributed system for the system of FIG. 1.

FIG. 15 illustrates a block diagram of a distributed system 1500. The distributed system 1500 may distribute portions of the structure and/or operations for the system 100 across multiple computing entities. Examples of distributed system 1500 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1500 may comprise a client device 1510 and a server device 1550. In general, the client device 1510 and the server device 1550 may be the same or similar to the client device 1420 as described with reference to FIG. 14. For instance, the client system 1510 and the server system 1550 may each comprise a processing component 1530 and a communications component 1540 which are the same or similar to the processing component 1430 and the communications component 1440, respectively, as described with reference to FIG. 14. In another example, the devices 1510, 1550 may communicate over a communications media 1512 using communications signals 1514 via the communications components 1540.

The client device 1510 may comprise or employ one or more client programs that operate to perform various methodologies in accordance with the described embodiments. In one embodiment, for example, the client device 1510 may implement, at least message interface component 184. The client device 1510 may also implement other applications and/or application components that allow client device 1510 to communicate with SNS 110 and present SNS 110 information and content to a member.

The server device 1550 may comprise or employ one or more server programs that operate to perform various methodologies in accordance with the described embodiments. In one embodiment, for example, the server device 1550 may implement some or all of the components of SNS 110. The server device 1550 may in particular implement message delivery component 140 and receive a message from client device 1510 for delivery and/or promotion to a member mailbox. Other components of SNS 110 may be implemented by server device 1550 or by other server devices similar to server device 1550 and in communication with server device 1550.

Figure 16:
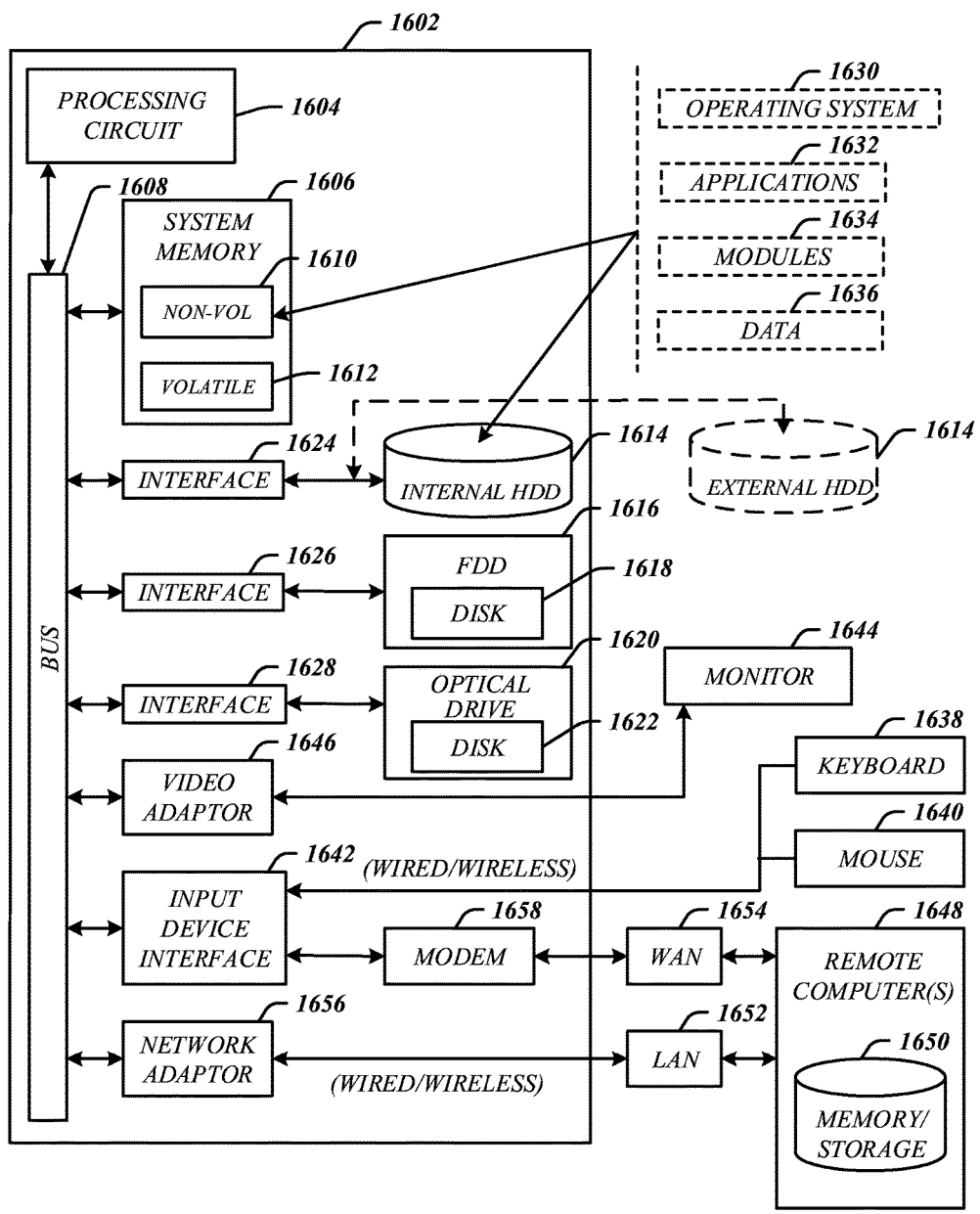
FIG. 16 illustrates an embodiment of a computing architecture.

FIG. 16 illustrates an embodiment of an exemplary computing architecture 1600 suitable for implementing various embodiments as previously described. In one embodiment, the computing architecture 1600 may comprise or be implemented as part of an electronic device. Examples of an electronic device may include those described with reference to FIG. 14, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1600.

As shown in FIG. 16, the computing architecture 1600 comprises a processing circuit 1604, a system memory 1606 and a system bus 1608. The processing circuit 1604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing circuit 1604.

The system bus 1608 provides an interface for system components including, but not limited to, the system memory 1606 to the processing circuit 1604. The system bus 1608 can be any of several types of bus structure that may further interconnect to a memory bus (with or without a memory controller), a peripheral bus, and a local bus using any of a variety of commercially available bus architectures. Interface adapters may connect to the system bus 1608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 16, the system memory 1606 can include non-volatile memory 1610 and/or volatile memory 1612. A basic input/output system (BIOS) can be stored in the non-volatile memory 1610.

The computer 1602 may include various types of computer-readable storage media in the form of one or more lower speed memory units, including an internal (or external) hard disk drive (HDD) 1614, a magnetic floppy disk drive (FDD) 1616 to read from or write to a removable magnetic disk 1618, and an optical disk drive 1620 to read from or write to a removable optical disk 1622 (e.g., a CD-ROM or DVD). The HDD 1614, FDD 1616 and optical disk drive 1620 can be connected to the system bus 1608 by a HDD interface 1624, an FDD interface 1626 and an optical drive interface 1628, respectively. The HDD interface 1624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1610, 1612, including an operating system 1630, one or more application programs 1632, other program modules 1634, and program data 1636. In one embodiment, the one or more application programs 1632, other program modules 1634, and program data 1636 can include, for example, the various applications and/or components of the system 100.

A user can enter commands and information into the computer 1602 through one or more wire/wireless input devices, for example, a keyboard 1638 and a pointing device, such as a mouse 1640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing circuit 1604 through an input device interface 1642 that is coupled to the system bus 1608, but can be connected by other interfaces such as a parallel port, IEEE 1394 serial port, a game port, a USB port, an IR interface, and so forth.

A monitor 1644 or other type of display device is also connected to the system bus 1608 via an interface, such as a video adaptor 1646. The monitor 1644 may be internal or external to the computer 1602. In addition to the monitor 1644, a computer typically includes other peripheral output devices, such as speakers, printers, and so forth.

The computer 1602 may operate in a networked environment using logical connections via wire and/or wireless communications to one or more remote computers, such as a remote computer 1648. The remote computer 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wire/wireless connectivity to a local area network (LAN) 1652 and/or larger networks, for example, a wide area network (WAN) 1654. Such LAN and WAN networking environments are commonplace in offices and companies, and facilitate enterprise-wide computer networks, such as intranets, all of which may connect to a global communications network, for example, the Internet.

When used in a LAN networking environment, the computer 1602 is connected to the LAN 1652 through a wire and/or wireless communication network interface or adaptor 1656. The adaptor 1656 can facilitate wire and/or wireless communications to the LAN 1652, which may also include a wireless access point disposed thereon for communicating with the wireless functionality of the adaptor 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wire and/or wireless device, connects to the system bus 1608 via the input device interface 1642. In a networked environment, program modules depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 17:
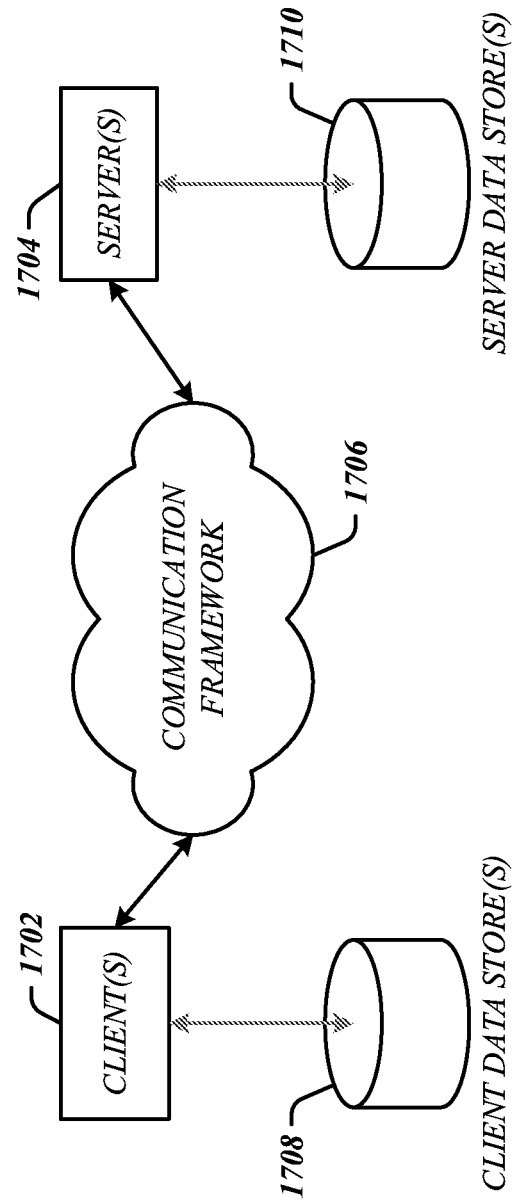
FIG. 17 illustrates an embodiment of a communications architecture.

FIG. 17 illustrates a block diagram of an exemplary communications architecture 1700 suitable for implementing various embodiments as previously described. The communications architecture 1700 includes various common communications elements, such as a transmitter, receiver, transceiver, radio, network interface, baseband processor, antenna, amplifiers, filters, power supplies, and so forth. The embodiments, however, are not limited to implementation by the communications architecture 1700.

As shown in FIG. 17, the communications architecture 1700 comprises includes one or more clients 1702 and servers 1704. The clients 1702 may implement the client device 1510. The servers 1704 may implement the server device 1550. The clients 1702 and the servers 1704 are operatively connected to one or more respective client data stores 1708 and server data stores 1710 that can be employed to store information local to the respective clients 1702 and servers 1704, such as cookies and/or associated contextual information.

The clients 1702 and the servers 1704 may communicate information between each other using a communication framework 1706. The communications framework 1706 may implement any well-known communications techniques and protocols. The communications framework 1706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

With general reference to notations and nomenclature used herein, the preceding detailed descriptions may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processor circuit;
a message generation component operative on the processor circuit to receive a request from a first member of a social networking service (SNS) to send a message to a second member of the SNS; and
a message delivery component operative on the processor circuit to deliver the message to a primary mailbox for the second member or a secondary mailbox of the second member based on a first parameter to represent a relationship type between the first and second members, a second parameter to represent a subscriber tier for the second member, a third parameter to represent a promotional cost associated with the subscriber tier, and a cool-off period during which the second member is assigned to a higher subscriber tier with a higher promotional cost,
the message delivery component to send a control directive to a message interface component associated with the first member to present an option to promote the message in exchange for payment of the promotional cost associated with the subscriber tier of the second member and to receive a control directive from the message interface accepting or denying the option,
the message delivery component to deliver the message to the primary mailbox and to start the cool-off period upon acceptance of the option or to deliver the message to the secondary mailbox upon denial of the option.

2. The apparatus of claim 1, the relationship type to indicate a defined relationship between the first and second members.

3. The apparatus of claim 1, the subscriber tier to indicate a range of subscribers for the second member.

4. The apparatus of claim 1, the promotional cost to indicate an amount of value needed to promote the message to a primary mailbox of the second member.

5. The apparatus of claim 1, the promotional cost to increase for higher subscriber tiers and decrease for lower subscriber tiers.

6. The apparatus of claim 1, the message delivery component to determine that the first and second members have no relationship in the SNS based on the first parameter, identify a subscriber tier for the second member based on the second parameter, and retrieve a promotional cost for promoting the message to a primary mailbox of the second member based on the third parameter.

7. The apparatus of claim 1, the message delivery component to receive a control directive representing payment authorization of the promotional cost associated with the subscriber tier of the second member, and promote the message to a primary mailbox of the second member in response to the payment authorization.

8. The apparatus of claim 1, the message delivery component to receive a control directive representing payment denial of the promotional cost associated with the subscriber tier of the second member, and demote the message to a secondary mailbox of the second member in response to the payment denial.

9. The apparatus of claim 1, the subscriber tier for the second member to include the cool-off period and a blocked time period for the second member.

10. The apparatus of claim 9, wherein the cool-off period is longer than the blocked time period.

11. The apparatus of claim 1, the message delivery component to start a timer for the cool-off period for the second member when the message is promoted to the primary mailbox of the second member.

12. The apparatus of claim 1, the message delivery component to monitor a number of promoted messages for the second member during the cool-off period, and assign the second member to a lower subscriber tier with a lower promotional cost after expiration of the cool-off period when the number of promoted messages is lower than a defined threshold value.

13. The apparatus of claim 1, the message delivery component to start a tinier for a blocked time period for the second member when the message is promoted to the primary mailbox of the second member.

14. The apparatus of claim 1, the message delivery component to determine that the first and second members have no relationship in the SNS based on the first parameter, identify a blocked subscriber tier for the second member based on the second parameter, and demote the message to a secondary mailbox of the second member.

15. The apparatus of claim 1, the message delivery component to start a timer for a blocked time period, and assign the second member from a blocked subscriber tier to a different subscriber tier after expiration of the blocked time period.

16. The apparatus of claim 1, comprising a message interface component operative on the processor circuit to present a messaging interface to a member of the SNS.

17. The apparatus of claim 1, wherein the message includes at least one of: a transaction between the first member and the second member and a reference to a transaction between the first member and the second member.

18. A computer-implemented method, comprising:
receiving a request to send a message from a first member to a second member in a social networking service (SNS);
accessing a tiered payment schedule including a first parameter to represent a relationship type between the first and second members, a second parameter to represent a subscriber tier for the second member, and a third parameter to represent a promotional cost associated with the subscriber tier;
sending a control directive to a client device of the first member to present an option to promote the message in exchange for payment of the promotional cost associated with the subscriber tier of the second member;
receiving a control directive from the client device of the first member accepting or denying the option; and
delivering the message to a primary mailbox of the second member upon acceptance of the option or to deliver the message to the secondary mailbox upon denial of the option.

19. The method of claim 18, comprising:
determining that the first and second members have no relationship in the SNS based on the first parameter;
identifying a subscriber tier for the second member based on the second parameter; and
retrieving a promotional cost for promoting the message to a primary mailbox of the second member based on the third parameter.

20. The computer-implemented method of claim 18, comprising:
determining a number of subscribers to the second member; and
assigning the subscriber tier to the second member according to the number of subscribers.

21. The computer-implemented method of claim 18, comprising:
receiving a selection from the first user not to promote the message; and
demoting the message to a secondary mailbox of the second member in response to the selection.

22. The computer-implemented method of claim 18, comprising:
monitoring a number of promoted messages for the second member during the cool-off period; and
assigning the second member to a lower subscriber tier with a lower promotional cost after expiration of the cool-off period when the number of promoted messages is lower than a defined threshold value.

23. The computer-implemented method of claim 18, comprising:
determining that the first and second members have no relationship in the SNS based on the first parameter;
identifying a blocked subscriber tier for the second member based on the second parameter; and
demoting the message to a secondary mailbox of the second member.

24. The computer-implemented method of claim 18, the subscriber tier associated with a blocked time period for the second member, the method comprising:
starting a timer for a blocked time period for the second member when a message is promoted to the primary mailbox of the second member;
assigning a blocked subscriber tier to the second member for the duration of the blocked time period; and
assigning the second member from the blocked subscriber tier to a different subscriber tier after expiration of the blocked time period.

25. The computer-implemented method of claim 18 comprising: including in the message at least one of: a transaction between the first member and the second member and a reference to a transaction between the first member and the second member.

26. At least one non-transitory computer-readable storage medium comprising instructions that, when executed, cause a system to:

provide a composition interface for composing a message receive a request from a first member of a social networking service (SNS) to send a message via a messaging interface to a second member in the SNS;

access a tiered payment schedule including a first parameter to represent a relationship type between the first and second members, a second parameter to represent a subscriber tier for the second member, and a third parameter to represent a promotional cost associated with the subscriber tier;

send a control directive to a client device of the first member to present an option in the composition interface to promote the message in exchange for payment of the promotional cost associated with the subscriber tier of the second member;

receive a control directive from the client device of the first member accepting or denying the option; and deliver the message to a primary mailbox of the second member upon acceptance of the option or to deliver the message to the secondary mailbox upon denial of the option.

27. The computer-readable storage medium of claim 26, comprising instructions that when executed cause the system to:

determine a number of subscribers to the second member; and assign a subscriber tier to the second member according to the number of subscribers.

28. The computer-readable storage medium of claim 26, comprising instructions that when executed cause the system to:

monitor a number of promoted messages for the second member during the cool-off period; and assign the second member to a lower subscriber tier with a lower promotional cost after expiration of the cool-off period when the number of promoted messages is lower than a defined threshold value.

29. The computer-readable storage medium of claim 26, comprising instructions that when executed cause the system to:

identify a blocked subscriber tier for the second member based on the second parameter; and demote the message to a secondary mailbox of the second member.

30. The computer-readable storage medium of claim 26, comprising instructions that when executed cause the system to:

start a timer for a blocked time period associated with the subscriber tier for the second member when a message is promoted to the primary mailbox of the second member;

assigning a blocked subscriber tier to the second member for the duration of the blocked time period; and assigning the second member from the blocked subscriber tier to a different subscriber tier after expiration of the blocked time period.

* * * * *

UNITED STATES PATENT AND TRADEMARK OFFICE
CERTIFICATE OF CORRECTION

PATENT NO. : 9,965,811 B2
APPLICATION NO. : 13/965574
DATED : May 8, 2018
INVENTOR(S) : Sizhe Chen, Anthony Kamenick and Lee Linden Page 1 of 1

It is certified that error appears in the above-identified patent and that said Letters Patent is hereby corrected as shown below:

In the Claims

Column 21, Line 38, replace "tinier" with -- timer --.

Signed and Sealed this
Twenty-sixth Day of June, 2018

Andrei Iancu
*Director of the United States Patent and Trademark Office*